United States Patent
Watanabe

(10) Patent No.: US 10,406,432 B2
(45) Date of Patent: Sep. 10, 2019

(54) VIRTUAL IMAGE DISPLAY PROGRAM, VIRTUAL IMAGE DISPLAY APPARATUS, AND VIRTUAL IMAGE DISPLAY METHOD

(71) Applicant: GREE, Inc., Tokyo (JP)

(72) Inventor: Masashi Watanabe, Tokyo (JP)

(73) Assignee: GREE, Inc., Tokyo (JP)

( * ) Notice: Subject to any disclaimer, the term of this patent is extended or adjusted under 35 U.S.C. 154(b) by 347 days.

(21) Appl. No.: 15/196,410

(22) Filed: Jun. 29, 2016

(65) Prior Publication Data

US 2017/0072305 A1 Mar. 16, 2017

(30) Foreign Application Priority Data

Sep. 16, 2015 (JP) ................................. 2015-183379

(51) Int. Cl.

| | | |
|---|---|---|
| *A63F 13/26* | (2014.01) | |
| *G06F 3/01* | (2006.01) | |
| *G06T 19/00* | (2011.01) | |
| *A63F 13/211* | (2014.01) | |
| *G06F 9/451* | (2018.01) | |
| *G06F 3/0484* | (2013.01) | |
| *A63F 13/428* | (2014.01) | |

(52) U.S. Cl.
CPC ............ *A63F 13/26* (2014.09); *A63F 13/211* (2014.09); *A63F 13/428* (2014.09); *G06F 3/011* (2013.01); *G06F 3/013* (2013.01); *G06F 3/017* (2013.01); *G06F 3/04842* (2013.01); *G06F 9/453* (2018.02); *G06T 19/006* (2013.01); *A63F 2300/8082* (2013.01)

(58) Field of Classification Search
CPC ....................................................... A63F 13/26
See application file for complete search history.

(56) References Cited

U.S. PATENT DOCUMENTS

| | | | | |
|---|---|---|---|---|
| 7,722,465 B2 * | 5/2010 | Sumi | ....................... | A63F 13/04 463/31 |
| 2013/0274016 A1 * | 10/2013 | Gagner | ............... | G07F 17/3211 463/34 |

(Continued)

FOREIGN PATENT DOCUMENTS

| | | |
|---|---|---|
| JP | 07-200162 A | 8/1995 |
| JP | 2005038008 A | 2/2005 |
| JP | 2013083731 A | 5/2013 |

OTHER PUBLICATIONS

"Social Virtual Reality", GREE Channel, Published on Sep. 9, 2015, Accessed on Jun. 28, 2016, URL: https://www.youtube.com/watch?v=E9hqxgk3Gn0; 2 pgs.

(Continued)

*Primary Examiner* — Jason Skaarup
(74) *Attorney, Agent, or Firm* — Maier & Maier, PLLC

(57) ABSTRACT

A game processing apparatus displays an image of virtual space on a display that displays an image by using a sensor for identifying the position and direction of a certain body part of a player and the display. A controller in the game processing apparatus displays the image of the virtual space on the display in accordance with the position and direction of the certain body part of the player, and, when an information providing condition regarding the position and direction of the certain body part of the player is satisfied, outputs to-be-provided information.

9 Claims, 5 Drawing Sheets

(56) References Cited

U.S. PATENT DOCUMENTS

| | | | |
|---|---|---|---|
| 2015/0277552 A1* | 10/2015 | Wilairat | H04N 21/4884 386/244 |
| 2016/0093105 A1* | 3/2016 | Rimon | G06T 19/006 345/633 |
| 2016/0259405 A1* | 9/2016 | Wilson | G06F 3/012 |
| 2017/0285737 A1* | 10/2017 | Khalid | G06F 3/013 |
| 2017/0315825 A1* | 11/2017 | Gordon | G06F 16/24575 |
| 2018/0004285 A1* | 1/2018 | Castleman | H04L 65/4069 |
| 2018/0024633 A1* | 1/2018 | Lo | G06F 3/0482 345/156 |

OTHER PUBLICATIONS

Office Action dated May 29, 2018 of corresponding Japanese application No. JP2015-183379; 9 pgs.

* cited by examiner

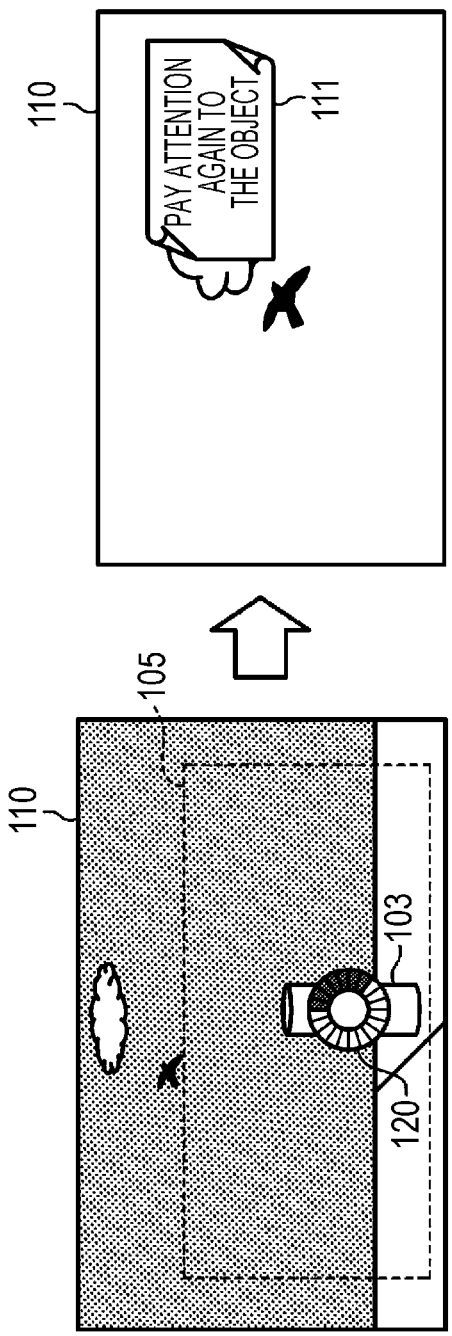

VIRTUAL IMAGE DISPLAY PROGRAM, VIRTUAL IMAGE DISPLAY APPARATUS, AND VIRTUAL IMAGE DISPLAY METHOD

FIELD

The present invention relates to a virtual image display program, a virtual image display apparatus, and a virtual image display method for displaying an image of virtual space on a display.

BACKGROUND

Virtual reality games played by displaying an image of virtual space on a head-mounted display (hereinafter referred to as "HMD") worn on the head of a player are understood in the art (see Japanese Unexamined Patent Application Publication No. 7-200162, for example). An example HMD may include, in an example configuration, a gyro sensor, with which the movement of the head of the player is detectable. When the player moves his/her head, the HMD changes the image displayed on the display in order to follow the movement of the head of the player. When the game image follows the movement of the head of the player as mentioned here, the player may stay more immersed in the game, and may accordingly be able to concentrate more on the game.

Virtual reality games, like other games, may sometimes provide information to a user; for example, they may display hints on the progress of the game, or may display menu items. However, this is most often accomplished by displaying a button, such as a menu button, together with an image of virtual space, such that when the button is selected, information may be provided. However, this results in a significantly reduced sense of immersion in the virtual space. Such a problem is not limited to virtual reality games, and may be present in a variety of displays of images of virtual space.

SUMMARY

According to an exemplary embodiment, a virtual image display program, a virtual image display apparatus, and a virtual image display method capable of providing information while reducing the loss of a sense of immersion in virtual space may all be provided.

According to an embodiment of the present invention, there may be provided a virtual image display program for displaying an image of virtual space on a display that displays an image by using a virtual image display apparatus, a detector for identifying a position and direction of a certain body part of a player, and the display. The virtual image display apparatus may include a controller and a storage unit where an information providing condition and to-be-provided information may be recorded. The program may cause the controller to function as a space image output unit and an information provider. The space image output unit may display the image of the virtual space on the display in accordance with the position and direction of the certain body part of the player. The information provider may output the to-be-provided information when the information providing condition regarding the position and direction of the certain body part of the player is satisfied. Accordingly, the information provider may execute information provision on the condition that the information providing condition regarding the movement of the gaze position of the player is satisfied. According to such an embodiment, there may be no need to display a button for executing information provision on an image of the virtual space. In doing so, information can be provided while reducing the loss of a sense of immersion in the virtual space.

According to various exemplary embodiments, the virtual space may include a target object selectable by a gaze of the player, an area including the target object may be recorded in the storage unit, the information providing condition may include the fact that a gaze position identified from the position and direction of the certain body part of the player becomes outside the area, and the controller may output the to-be-provided information when the gaze position of the player becomes outside the area. Accordingly, information can be provided when selection of a target object is interrupted, such as when the player is not sure about how to progress the game. In doing so, information provision can be executed with the appropriate timing.

According to various exemplary embodiments, the virtual space may include a target object selectable by a gaze of the player, the information providing condition may include the fact that a gaze position identified from the position and direction of the certain body part of the player moves outside the target object before the player completes selecting the target object, and the controller may output the to-be-provided information when the gaze position of the player moves outside the target object before the player completes selecting the target object. Accordingly, information can be provided when the player fails in selecting a target object. In doing so, information provision can be executed with the appropriate timing.

According to various exemplary embodiments, a reference range regarding movement of the certain body part of the player may be recorded as the information providing condition in the storage unit, the information providing condition may include the fact that the movement of the certain body part of the player becomes outside the reference range, and the controller may output the to-be-provided information when the movement of the certain body part of the player becomes outside the reference range. Accordingly, the information providing condition may be satisfied when the movement range of the certain body part is too narrow or too wide. In doing so, information provision can be executed with the appropriate timing.

According to various exemplary embodiments, a predetermined movement of the certain body part of the player may be recorded in the storage unit, the information providing condition may include the fact that movement of the certain body part of the player corresponds to the predetermined movement recorded in the storage unit, and the controller may output the to-be-provided information when the movement of the certain body part of the player corresponds to the predetermined movement. Accordingly, the information providing condition may be satisfied when the movement range of the certain body part corresponds to the predetermined movement. In doing so, information provision can be executed with the appropriate timing.

According to an exemplary embodiment, the information provider may display the to-be-provided information on an object in the virtual space. Accordingly, information can be provided to the player in a natural form.

According to an exemplary embodiment, the information provider may display the to-be-provided information in a direction in which a moving body moves, the moving body being an object in the virtual space and moving in the virtual space. In doing so, information can be provided without reducing a sense of immersion in the virtual space.

Therefore, according to the virtual image display program, the virtual image display apparatus, and the virtual image display method according to the embodiments of the present invention, information can be provided while reducing the loss of a sense of immersion in a virtual space.

BRIEF DESCRIPTION OF THE DRAWINGS

Exemplary

Exemplary

Exemplary

Exemplary

Exemplary

Exemplary

Exemplary FIG. 7A is a diagram illustrating an exemplary embodiment of an image that may be displayed on a virtual image display, in a state where attention is being paid to a target object.

Exemplary FIG. 7B is a diagram illustrating an exemplary embodiment of an image that may be displayed on a virtual image display, in a state where a hint is displayed.

DETAILED DESCRIPTION

Hereinafter, a virtual image display program, a virtual image display apparatus, and a virtual image display method according to a first exemplary embodiment will be described. According to an exemplary embodiment, the virtual image display apparatus may be implemented as a game processing apparatus that progresses a game while displaying an image of virtual space. The gameplay of this game may progress according to the assumption that the player will wear a head-mounted display (HMD) on his/her head.

Figure 1:
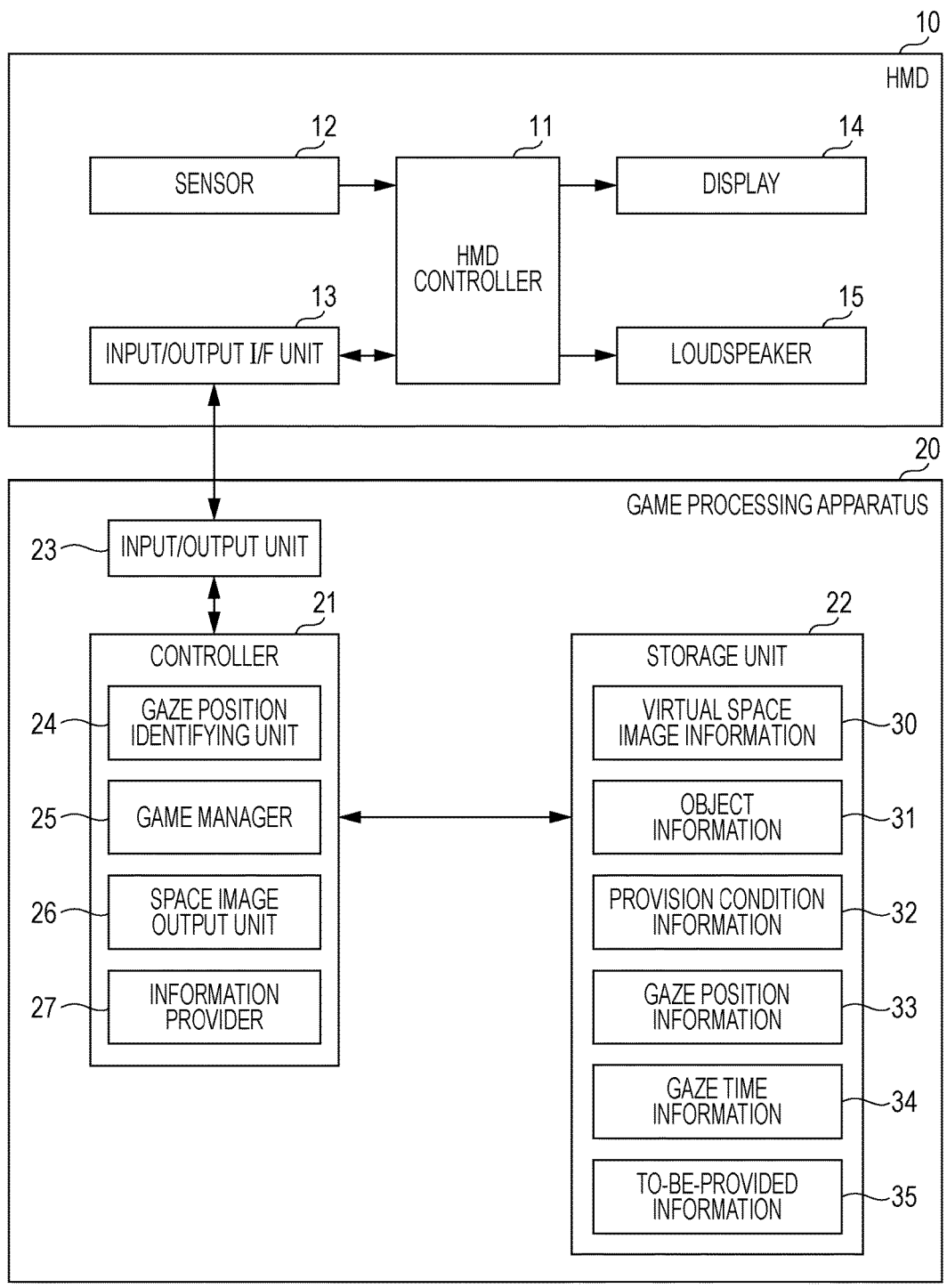
FIG. 1 is a schematic diagram describing an exemplary embodiment of a virtual image display system.

Referring to FIG. 1, the configuration of a system including an HMD 10 and a game processing apparatus 20 will be described. At first, the configuration of the HMD 10 connected to the game processing apparatus 20 will be described. The HMD 10 may include an HMD controller 11, a sensor 12 serving as a detector, and an input/output interface unit (I/F unit) 13. The HMD controller 11 may output various types of information to the game processing apparatus 20 and may receive various types of information from the game processing apparatus 20 via the input/output I/F unit 13. The sensor 12 may be or may include a detector for identifying the position and direction of the head of the player. According to an exemplary embodiment, the sensor 12 may include at least one of a gyro sensor, an acceleration sensor, and a geomagnetic sensor, and may detect the movement of the head of the player. Alternatively, a device that directly detects the movement of the eyeballs of the player, such as a line-of-sight detecting sensor that emits near-infrared light into the iris and detects its reflected light, may be used as the sensor 12. According to an exemplary embodiment, the head of the player may be the certain body part of a player that has its position and direction identified and tracked.

The HMD 10 may include a display 14 that displays an image, and a loudspeaker 15 that outputs sound. For example, according to an exemplary embodiment, the display 14 may display an image to be visually recognized by the left eye and an image to be visually recognized by the right eye with a parallax. This may allow the player to visually recognize a stereoscopic image while perceiving a sense of depth. The HMD controller 11 may display on the display 14 an image in accordance with an image signal received from the game processing apparatus 20 via the input/output I/F unit 13. According to an exemplary embodiment, the loudspeaker 15 may be, for example, a headphone, and may be used to, for example, output sound effects and sound that describe the progress of the game.

Next, the configuration of the game processing apparatus 20 will be described. The game processing apparatus 20 may include a controller 21, a storage unit 22, and an input/output unit 23. The controller 21 may include hardware elements including a central processing unit (CPU), random-access memory (RAM), and read-only memory (ROM). The controller 21 may include a gaze position identifying unit 24, a game manager 25, a space image output unit 26, and an information provider 27. According to an exemplary embodiment, the controller 21 may cause the hardware elements to execute the virtual image display program to function as the gaze position identifying unit 24, game manager 25, space image output unit 26, and information provider 27.

According to an exemplary embodiment, the storage unit 22 may store virtual space image information 30, object information 31, provision condition information 32, gaze position information 33, gaze time information 34, and to-be-provided information 35.

According to an exemplary embodiment, the virtual space image information 30 may be data for rendering an image of the virtual space background and objects. The objects may include target objects, which are selectable, and non-selectable objects. In an exemplary embodiment, the player may be able to select a target object by continuously gazing at the target object for a certain period of time.

According to an exemplary embodiment, the object information 31 may be information that indicates each object's attributes. Specifically, the object information 31 may include each object's identifier, coordinates in the virtual space, type, and selection state. The object's type may be, for example, information that indicates whether the object is a target object or an object other than a target object. The object's selection state may be information that indicates, when the object is a target object, whether the object is selected or not.

According to an exemplary embodiment, the provision condition information 32 may be information that defines an information providing condition, which may be defined as a condition for providing information to the player. According to an exemplary embodiment, the provision condition information 32 may be information that defines, when the time elapsed since the start of the game is a certain time or longer, the gaze position of the player is outside a gameable area set in the virtual space. The gameable area may be an area where the player can select a target object by gazing at that object, and may include all target objects. For example, the provision condition information 32 may include coordinate information of the gameable area. When the information providing condition is satisfied, the player may be given a hint on the progress of the game.

According to an exemplary embodiment, the gaze position information 33 may be information that indicates the identified gaze position of the player, in terms of coordinates, in the virtual space. The gaze time information 34 may be information that indicates a period of time in which the player continuously gazes at a target object. The to-be-provided information 35 may include information that indicates the details of a hint for accomplishing a mission of the game.

According to an exemplary embodiment, the gaze position identifying unit 24 may receive a detection signal obtained by the sensor 12, from the HMD controller 11 of the HMD 10, worn on the player, via the input/output unit 23. The gaze position identifying unit 24 may identify the gaze position, in terms of coordinates, in the virtual space in accordance with the received detection signal, and may update the gaze position information 33 with the identified gaze position.

The game manager 25 may compare the gaze position information 33 with the object information 31 and may determine whether the gaze position is on a target object. When the game manager 25 determines that the gaze position is on a target object, the game manager 25 may measure a time (gaze time) in which the player continuously gazes at the target object, and may update the gaze time information 34 with the gaze time. The game manager 25 may also determine whether the gaze time, indicated by the gaze time information 34, has reached a certain predetermined time (such as, for example, three seconds). When the gaze time information 34 has reached the certain predetermined time, the game manager 25 may determine that selection of the target object is completed.

The game manager 25 also determines whether a mission of the game has been completed. For example, according to an exemplary embodiment, the game manager 25 may determine that a mission has been accomplished once there are a certain number of objects that have been completely selected within a limit time. However, when the time that has elapsed since the start of the game reaches a limit time while the number of target objects that have been completely selected is less than the target score, the game manager 25 may determine that the game is over.

According to an exemplary embodiment, the game manager 25 may further determine whether the information providing condition is satisfied on the basis of the provision condition information 32. An example information providing condition may be a condition where the time that has elapsed since the start of the game exceeds a certain predetermined time, and the gaze position of the player is outside the gameable area. The certain predetermined time may be set as, for example, a time at which there is very little remaining time until the limit time, or an average time required for the player to accomplish the mission. When the game manager 25 determines that the information providing condition is satisfied, the game manager 25 may output to the information provider 27 a request for outputting the to-be-provided information 35.

The game manager 25 may also extract audio information such as sound effects and sound that describes the progress of the game from an audio information storage unit (not illustrated), and may transmit the audio information to the HMD 10 via the input/output unit 23.

The space image output unit 26 may extract the virtual space image information 30 within a field-of-view range around the coordinates indicated by the gaze position information 33, and may transmit the extracted virtual space image information 30 as an image signal to the HMD 10. The space image output unit 26 may also display a character corresponding to the player in the virtual space. When the game manager 25 determines that selection of a target object is completed, the space image output unit 26 may change the display form of the target object, which has been completely selected.

According to an exemplary embodiment, upon receipt of a request for displaying a hint, which may be output from the game manager 25, the information provider 27 may read the to-be-provided information 35. The information provider 27 may output a display corresponding to the to-be-provided information 35 to the display 14, and may display the output display on a virtual space image.

Figure 2:
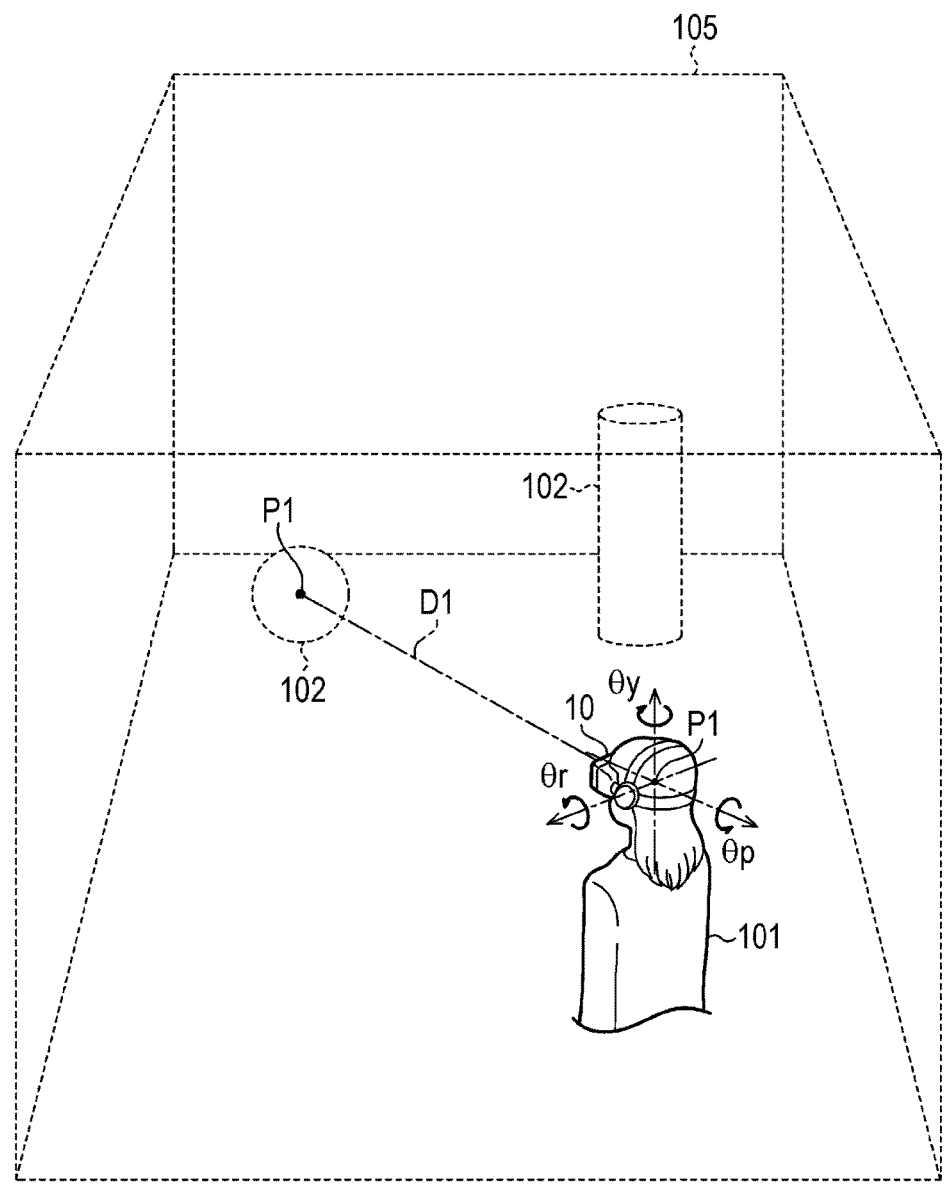
FIG. 2 is a conceptual diagram illustrating an exemplary embodiment of a gameable area in virtual space.

Referring next to FIG. 2, an object selecting function performed by the game processing apparatus 20 will be described.

The gaze position identifying unit 24 may receive, from the HMD 10, a detection signal obtained by the sensor 12, and may identify the position and direction of the head of a player 101 in accordance with the detection signal. Specifically, the gaze position identifying unit 24 may calculate the position and direction of the head as a position in three-axis directions and an angle around each axis. This may include, for example, determining the position of the head along the X-axis along a horizontal direction and a pitch $\theta p$ of the head indicating a rotation direction around the X-axis, determining the position of the head along the Y-axis along a vertical direction and a yaw $\theta y$ of the head indicating a rotation direction around the Y-axis, and determining the position of the head along the Z-axis along a depth direction and a roll $\theta r$ of the head indicating a rotation direction around the Z-axis.

According to an exemplary embodiment, the gaze position identifying unit 24 may identify a gaze position P1 of the player 101 in the virtual space, on the basis of the calculated position and direction of the head. A method of the related art may be used as a method of identifying the gaze position. For example, the gaze position identifying unit 24 may virtually set a straight line connecting the left eye position and the right eye position, and may set, as a line-of-sight direction D1, a direction that extends in a direction orthogonal to the straight line and that crosses the midpoint of the left eye position and the right eye position. The gaze position identifying unit 24 may further identify the intersection between the line-of-sight direction D1 and an object 102 (or background) as the gaze position P1. When a device that detects the eyeball movement or light reflected from the interior of the iris is used as the sensor 12, the line-of-sight direction may be identified on the basis of the eyeball movement or the reflected light.

According to an exemplary embodiment, a gameable area 105 may be provided in the virtual space. The gameable area 105 may be set around a character corresponding to the player. Since the gameable area 105 may include all target objects 103, the gaze position P1 may be located in the gameable area 105 when the player gazes at one of the target objects 103 to select that target object 103.

According to an exemplary embodiment, the space image output unit 26 may extract the virtual space image information 30 within a field-of-view range around the gaze position P1, and may transmit the extracted virtual space image information 30 as an image signal to the HMD controller 11. The HMD controller 11 may output an image in accordance with the received virtual space image information 30 to the display 14.

Figure 3:
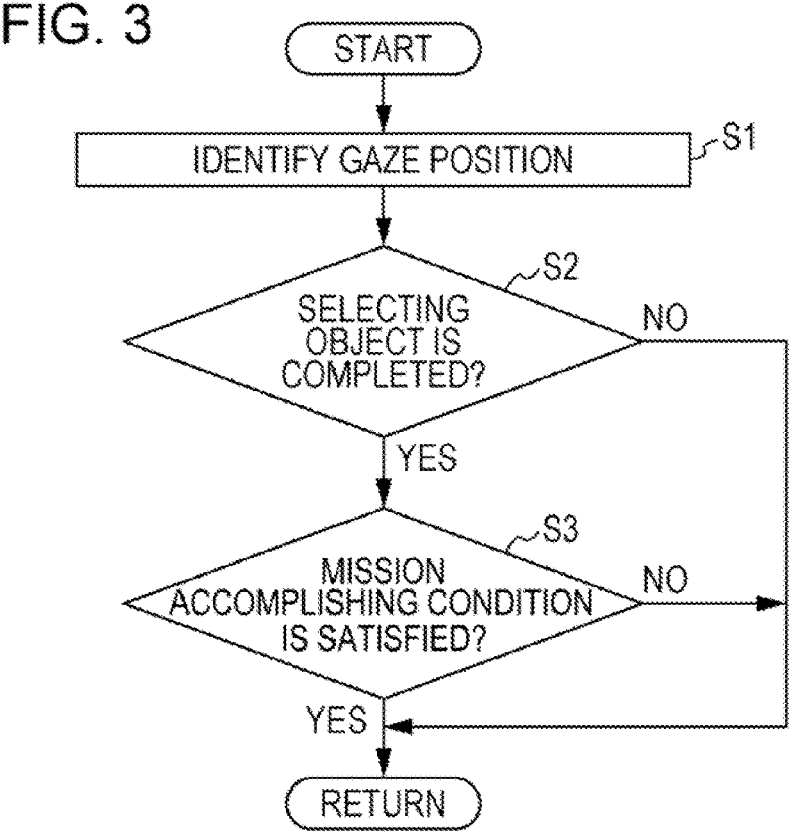
FIG. 3 is a flowchart illustrating an exemplary embodiment of the procedure of a game progressing process.

Referring next to FIG. 3, a process by which a game may progress will be described. According to an exemplary embodiment, a condition for ending the process may be one of the following: the satisfaction of the mission accomplishing condition, and the elapsed time since the start of the game reaching the limit time. The process may be repeated until this ending condition is satisfied. The elapsed time may be measured by the game manager 25 until the game ends, and may be measured on the basis of a system time (for example, using a clock signal of the CPU).

When the game starts, the controller 21 may identify the gaze position of the player (step S1). Specifically, the gaze position identifying unit 24 in the controller 21 may identify the gaze position of the player using the above-mentioned method, and may update the gaze position information 33 with the identified gaze position.

Using the gaze position information 33, the controller 21 may determine whether selection of a target object is completed (step S2). Specifically, the game manager 25 in the controller 21 may read the object information 31 of a target object and the gaze position information 33 from the storage unit 22, may compare the coordinates of the target object with the gaze position, and may determine whether the gaze position is on the target object.

When the gaze position is on the target object, the game manager 25 may measure the gaze time using the system time or the like, and may update the gaze time information 34 with the measured gaze time. When the gaze time reaches a certain predetermined time interval, the game manager 25 may determine that selection is completed.

According to an exemplary embodiment, when the gaze position becomes outside the target object while the gaze time has not yet met the appropriate predetermined time interval, the game manager 25 may determine that selection of the target object has not been completed ("NO" in step S2), and may reset the gaze time and return to step S1.

When the game manager 25 determines that selection of the target object is completed ("YES" in step S2), the game manager 25 may update the selection status of the object information 31 to "selection completed", and may proceed to step S3. At this time, the space image output unit 26 may change the display form of the target object, to reflect that it has been completely selected.

When selection of the target object is completed, the controller 21 may determine whether the mission accomplishing condition has been satisfied (step S3). Specifically, the game manager 25 in the controller 21 may refer to the selection status included in the object information 31, and may determine whether there are a certain number of target objects that have been completely selected within the limit time of the game. This number may be called a "target object target score."

When the number of target objects that have been completely selected is at least the target object target score, the controller 21 may determine that the mission accomplishing condition has been satisfied ("YES" in step S3). This may satisfy the condition for ending the game progressing process, and the game thus may be caused to end.

When the number of target objects that have been completely selected is less than the target object target score, the controller 21 may determine that the mission accomplishing condition is not satisfied ("NO" in step S3), and may return to step S1. Specifically, when the game manager 25 in the controller 21 determines that the mission accomplishing condition is not satisfied, the game manager 25 may identify the gaze position in step S1.

Figure 4:
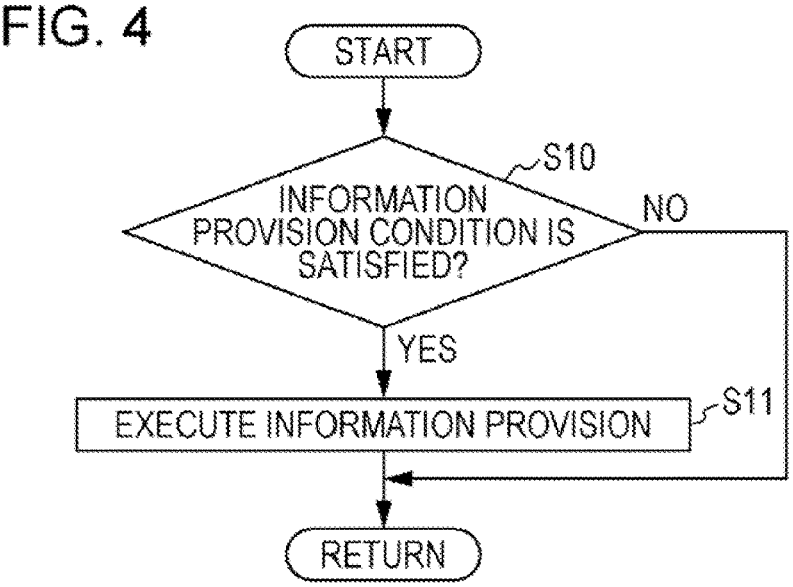
FIG. 4 is a flowchart illustrating an exemplary embodiment of the procedure of an information providing process.

Referring next to FIG. 4, an exemplary procedure of an information providing process will be described. According to an exemplary embodiment, the process may be a process executed independently and in parallel with the game progressing process.

According to an exemplary embodiment, a condition for ending the process may be one of the following: the satisfaction of the mission accomplishing condition, and the time elapsed since the start of the game reaching the limit time before the mission is accomplished. The process may be repeated until this ending condition is satisfied.

The controller 21 in the game processing apparatus 20 may determine whether the information providing condition has been satisfied (step S10). Specifically, the game manager 25 in the controller 21 may determine whether the elapsed time has reached a predetermined time interval and the gaze position is outside the gameable area.

To do so, the game manager 25 may obtain the amount of elapsed time, and may determine whether the elapsed time has reached a predetermined time interval. When it is determined that the elapsed time has reached the predetermined time interval, the game manager 25 may read the gaze position information 33 and the provision condition information 32 from the storage unit 22, and may determine whether the gaze position is outside the gameable area. When it is determined that the gaze position is outside the gameable area, the game manager 25 may determine that the information providing condition has been satisfied.

When it is determined that the information providing condition has been satisfied ("YES" in step S10), the controller 21 may execute the information provision (step S11). Specifically, according to an exemplary embodiment, the game manager 25 in the controller 21 may output an information provision request to the information provider 27. Upon receipt of the information provision request, the information provider 27 may read the to-be-provided information 35 from the storage unit 22, and may output the to-be-provided information 35 to the HMD 10.

In contrast, when the information providing condition has not yet been determined to be satisfied ("NO" in step S10), the controller 21 may repeatedly determine whether the information providing condition has been satisfied (step S10).

According to an exemplary embodiment, a process used to provide information may be linked with a process used to progress the game. For example, when selection of a target object is completed in the game progressing process ("YES" in step S2), or when it is determined that the mission accomplishing condition has been satisfied ("YES" in step S3), the elapsed time which is measured in order to determine when information may be provided may be reset. Alternatively, on the basis of the determination that selection of a target object is completed in the information providing process (step S2), the time in which no target object is selected at all after the start of the game may be used as an "elapsed time" value for purposes of determining when information may be provided, rather than the amount of time that has elapsed since the start of the game. The time in which no target object has been selected at all after the start of the game reaching a certain time, and the gaze position being outside the gameable area may serve as the information providing condition.

Figure 5:
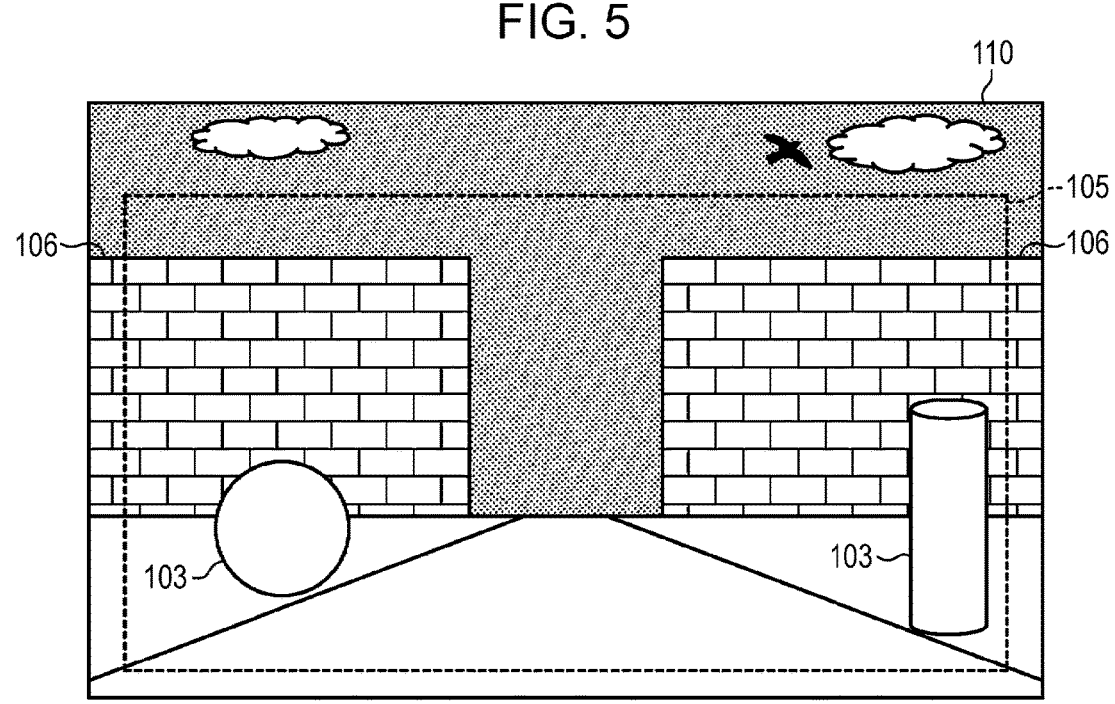
FIG. 5 is a schematic diagram illustrating an exemplary embodiment of an image that may be displayed on a virtual image display.
Figure 6:
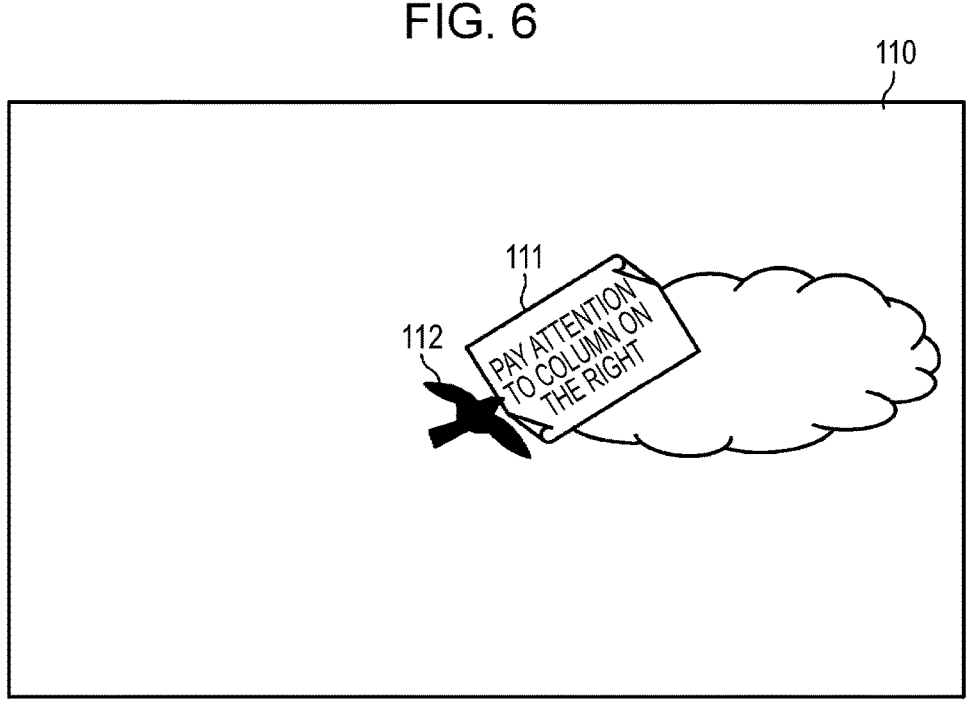
FIG. 6 is a schematic diagram illustrating an exemplary embodiment of an image that may be displayed on a virtual image display, wherein a hint is displayed.

Referring next to FIGS. 5 and 6, an image displayed on the display 14 of the HMD 10 during the progress of the game will be described. According to an exemplary embodiment, virtual space images illustrated in FIGS. 5 and 6 may be schematically illustrated independently of the field-of-view range of the HMD 10.

As illustrated in FIG. 5, according to an exemplary embodiment, a virtual space image 110 that is an image based on the virtual space image information 30 and that is around the gaze position may be displayed on the display 14 of the HMD 10. In the virtual space image 110, target objects 103 may be displayed in the gameable area 105. Objects 106 other than the target objects 103 may be displayed in the gameable area 105.

As illustrated in FIG. 6, according to an exemplary embodiment, when the gaze position is moved to a position outside the gameable area 105, an information provision display 111 may be output, which may overlap the virtual space image 110 outside the gameable area 105. The information provision display 111 may display the details of a hint based on the to-be-provided information 35. Since the information provision display 111 may be displayed overlapping the virtual space image 110 outside the gameable area 105, the information provision display 111 may not overlap the target objects 103. According to an exemplary embodiment wherein the information provision display 111 does not overlap the target objects 103, information can be provided without obstructing the player in selecting one of the target objects 103. According to an exemplary embodiment wherein the information provision display 111 is not displayed until the elapsed time exceeds the certain time, the player may not be bothered by frequent information provision.

Referring to FIG. 6, according to an exemplary embodiment, a moving body 112, which may appear as a bird moving outside the gameable area 105, is displayed holding the information provision display 111 where the hint is described. That is, the information provision display 111 may move in accordance with the speed and direction in which the moving body 112 moves. The moving body 112 and the information provision display 111 may be rendered as objects in the virtual space such that their image attributes, such as their lightness and tone, fit the virtual space image 110. According to such an exemplary embodiment, by having an object in the virtual space hold the information provision display 111, information can be provided without reducing the loss of a sense of immersion in the virtual space.

According to an exemplary embodiment, when the gaze position becomes outside the gameable area like the above case, it may be determined that selection of a target object has not been smoothly performed, and the information provision display 111 may be displayed. In doing so, information can be provided with the appropriate timing for the player. According to an exemplary embodiment, by providing information on the basis of the movement of the gaze position like the above case, potentially immersion-breaking structures, such as, for example, a button for executing information provision, can be omitted. This can reduce the extent to which a sense of immersion in the virtual space may be lost.

As has been described above, according to an exemplary embodiment, the following advantageous effects may be obtained:

First, since information provision is executed based on the condition that the movement of the gaze position of the player matches the information providing condition, there may be no need to display a button for executing information provision on an image of the virtual space. In doing so, information can be provided while reducing the loss of a sense of immersion in the virtual space.

Second, in the above-described first embodiment, information provision may be executed when the gaze position of the player becomes outside the gameable area that includes all target objects. That is, information can be provided when selection of a target object is interrupted, such as when the player is not sure about how to progress the game. In doing so, information provision can be executed with the appropriate timing.

Third, according to an exemplary embodiment, the hint may be displayed on the object (moving body) moving in the virtual space described above. Since the player pays attention to a moving thing, attention from the player can be naturally drawn to the hint.

Referring next to FIGS. 4 to 7, another exemplary embodiment of a virtual image display program, a virtual image display apparatus, and a virtual image display method may be described.

According to an exemplary embodiment, an information providing condition may alternatively be that the player has stopped gazing at a target object before completely selecting that target object, and/or may be that the gaze position after the player stops gazing has moved to outside the gameable area.

Referring to FIG. 4, according to an exemplary embodiment, an information providing process may be described. A condition for ending the process may be that one of the following is satisfied: that the satisfaction of the mission accomplishing condition, and the time elapsed since the start of the game reaching the limit time before the mission is accomplished. The process is repeated until this ending condition is satisfied.

The controller 21 in the game processing apparatus 20 may determine whether the information providing condition has been satisfied (step S10). Specifically, the game manager 25 in the controller 21 may read the gaze position information 33 and the object information 31 from the storage unit 22, and may determine whether the gaze position is on a target object. When the gaze position is not on a target object, the game manager 25 may determine that the information providing condition is not satisfied ("NO" in step S10), and may repeat the determination in step S10.

When it is determined that the player has gazed at a target object, the game manager 25 may obtain the gaze time, and may determine whether the gaze position has been set to a position outside the gameable area before the gaze time reaches the required time for selecting a target object. When the gaze position is on the target object, the game manager 25 may determine that the information providing condition is not satisfied ("NO" in step S10), and may repeat the determination in step S10.

However, according to an exemplary embodiment, when the gaze position is moved to outside the gameable area before the gaze time in which the player has continuously gazed at the target object reaches the required time to select the target object, the game manager 25 may provide information (step S11).

Referring to FIGS. 7A and 7B, according to an exemplary embodiment, certain images as may be described may be displayed on the display 14 of the HMD 10 during the progress of the game. Virtual space images illustrated in FIG. 7 may be schematically illustrated independently of the field-of-view range of the HMD 10.

As illustrated in FIG. 7A, when the player gazes at a target object 103 displayed on the virtual space image 110, the space image output unit 26 may display a gauge 120 overlapping the target object 103. The gauge 120 may display the time elapsed from when the player starts gazing to when the gaze time reaches the certain time.

Now, as illustrated in FIG. 7B, when the gaze position on the target object 103 is moved to outside the gameable area 105, the information provision display 111 may be output.

In FIG. 7B, according to an exemplary embodiment, the information provision display 111 may be displayed in a direction in which the moving body 112, which may be, for example, a bird, may move or may be moved. Typical players may tend to pay more attention to the moving body 112 than to a still object. Therefore, according to an exemplary embodiment, displaying the information provision display 111 ahead of the moving body and in the direction in which the moving body 112 is moving may make it easier for the player to recognize the information provision display 111. According to an exemplary embodiment, the information provision display 111 may be displayed in a still state, which may allow the player to easily recognize the details of the information provision display 111.

As has been described above, according to an exemplary embodiment, a plurality of movements of the player may be defined, which may include, for example, a player stopping gazing at a target object before completely selecting that target object, and the gaze position of the player after the player stops gazing being moved to outside the gameable area. In doing so, the player's circumstance can be more accurately determined by taking into consideration these multiple movements.

According to an exemplary embodiment, the following advantageous effects may be obtained:

First, the information providing condition may be that, before the player completes selecting a target object, the gaze position of the player is moved to a position outside the target object and outside the gameable area. Accordingly, information can be provided when the player fails in selecting a target object. In doing so, information provision can be executed with the appropriate timing.

Second, according to an exemplary embodiment, the information provision display 111 may be displayed in a direction in which the moving body 112, which is an object moving in the virtual space, such as a bird, moves. In doing so, information provision can be output without reducing a sense of immersion in the virtual space.

Referring next to FIG. 4, according to an alternative exemplary embodiment, a virtual image display program, a virtual image display apparatus, and a virtual image display method may be described.

According to an exemplary embodiment, the information providing condition may be that, before the player accomplishes the mission, the movement range of a certain body part of the player is moved to outside the reference movement range of the certain body part for selecting a target object. For example, the certain body part of the player may be the head. The reference movement range of the head for selecting a target object may be determined in advance. According to an exemplary embodiment, this may enable the playing of the game without requiring a gameable area to be set.

The movement range of the head of the player may indicate the movement range of the head since the start of the game. The movement range of the head of the player may be defined as, for example, the range of pitch θp, yaw θy, and roll θr indicating angular coordinates. The predetermined movement range of the head may be recorded as, for example, part of the provision condition information 32 in the storage unit 22.

When the movement range of the head of the player is narrower than the predetermined reference range for the head of the player, there is a possibility that the range where the player is gazing is too narrow. In contrast, when the movement range of the head of the player is wider than the predetermined reference range, this may indicate that the player has not been able to accomplish the mission, even though the range where the player is gazing is wide enough. This may thus indicate the possibility that the player is not sure about the mission accomplishing condition or the operation method, or that the player has been unable to find a target object. In such a case where the movement range of the head of the player is too narrow or too wide, a hint on the progress of the game may be provided, thereby helping the player to accomplish the mission.

Referring to FIG. 4, an exemplary embodiment of the information providing process will be described. A condition for ending the process may be one of the following: the satisfaction of the mission accomplishing condition, and the time elapsed since the start of the game reaching the limit time before the mission is accomplished. The process may be repeated until this ending condition is satisfied.

The controller 21 in the game processing apparatus 20 may determine whether the information providing condition has been satisfied (step S10). Specifically, the game manager 25 in the controller 21 may calculate the movement range of the head of the player. According to an exemplary embodiment, the history of the movement of the head of the player since the start of the game may be accumulated. The game manager 25 may read the provision condition information 32, and may determine whether the movement range of the head of the player is within the reference range included in the provision condition information 32. For example, according to an exemplary embodiment, a range defined for the above-mentioned three rotation directions may be used as the reference range included in the provision condition information 32.

When the movement range of the head of the player has been outside the reference range for at least one rotation direction, the game manager 25 may make a determination that the movement range of the head of the player is outside the reference range.

According to an exemplary embodiment, when it is determined that the information providing condition is not satisfied ("NO" in step S10), the controller 21 may repeat the determination about whether the information providing condition has been satisfied (step S10). Specifically, the game manager 25 in the controller 21 may determine that the information providing condition is not satisfied when the movement range of the head of the player becomes outside the reference range for at least one rotation direction, and may repeat the determination in step S10.

According to an exemplary embodiment, when it is determined that the information providing condition has been satisfied ("YES" in step S10), the controller 21 may execute information provision (step S11). Specifically, the game manager 25 may determine that the information providing condition has been satisfied when the movement range of the head of the player is within the reference range for all the rotation directions, and may then execute information provision.

According to an exemplary embodiment, the following advantageous effects may be obtained:

According to an exemplary embodiment, the information providing condition may be that the movement range of the head of the player has become a range outside the predetermined reference range. Accordingly, the information providing condition may be satisfied when the range in which the player gazes is too wide, or alternatively when the range in which the player gazes is too narrow. This may ensure that information provision can be executed with the appropriate timing.

Referring next to FIG. 4, another exemplary embodiment of a virtual image display program, a virtual image display apparatus, and a virtual image display method will be described.

According to an exemplary embodiment, an information providing condition may be that the movement of the certain body part of the player corresponds to a predetermined movement. For example, the certain body part of the player may be the head. For example, according to an exemplary embodiment, a predetermined movement of the head that may act as an information providing condition may be an unstable and peculiar movement different from the normal movement of the head of the player when the player is selecting a target object. Examples of the predetermined movement may include movements that indicate that the player is nervous or in a hurry.

The movement of the head of the player may be represented by, for example, the average movement speed of the head of the player, the maximum or minimum movement speed of the head of the player, the number of conversions in the movement direction per unit time, or the like. The movement speed of the head of the player may be calculated by the controller 21 in the game processing apparatus 20 from the identified position and direction of the head of the player. The provision condition information 32 may include a predetermined movement of the head of the player, which may be determined in advance. Specifically, the provision condition information 32 may include a predetermined peculiar movement of the head, which may be different from the movement for selecting a target object.

Referring to FIG. 4, an exemplary embodiment of the information providing process may be described. A condition for ending the process may be one of the following: the satisfaction of the mission accomplishing condition, and the time elapsed since the start of the game reaching the limit time before the mission is accomplished. The process may be repeated until this ending condition is satisfied.

The controller 21 in the game processing apparatus 20 may determine whether the information providing condition has been satisfied (step S10). Specifically, the game manager 25 in the controller 21 may calculate the movement of the head of the player, such as the average movement speed of the head of the player, using the position and direction of the head of the player, which may be calculated in accordance with a detection signal received from the sensor 12. The game manager 25 may read the provision condition information 32, and may determine whether the calculated movement of the head of the player corresponds to the predetermined movement of the head of the player, which may be included in the provision condition information 32.

According to an exemplary embodiment, when it is determined that the information providing condition has not been satisfied ("NO" in step S10), the controller 21 may repeat the determination of whether the information providing condition has been satisfied (step S10). Specifically, the game manager 25 in the controller 21 may determine that the information providing condition is not satisfied when the movement of the head of the player does not correspond to the predetermined movement included in the provision condition information 32, and may repeat the determination in step S10.

In contrast, when it is determined that the information providing condition has been satisfied ("YES" in step S10), the controller 21 may execute information provision (step S11). Specifically, the game manager 25 in the controller 21 may determine that the information providing condition is satisfied when the movement of the head of the player corresponds to the predetermined movement included in the provision condition information 32, and may then execute information provision.

As has been described above, according to an exemplary embodiment, the following advantageous effects may be obtained:

According to an exemplary embodiment, the information providing condition may be that the movement of the head of the player corresponds to a predetermined movement recorded in the storage unit 22. Accordingly, the information providing condition may be satisfied when the player makes such a movement, for example, as if the player is not sure about how to progress the game. According to such an embodiment, information provision can be executed with the appropriate timing.

Further exemplary embodiments of the invention may also be understood. For example, in some embodiments, the gameable area may be an area that includes all target objects. However, in other exemplary embodiments, it may only be necessary for the gameable area to be an area that at least includes a certain number of target objects for accomplishing the mission.

According to some exemplary embodiments, the set of displayed objects may include target objects that are selectable and objects that are not selectable. However, according to other exemplary embodiments, all objects displayed in the virtual space may be selectable objects.

According to some exemplary embodiments, the mission accomplishing condition of the game may be that there are a certain number of target objects that are completely selected within the limit time of the game. Alternatively, the mission accomplishing condition may be another condition or multiple other conditions. For example, the mission accomplishing condition may be satisfied when the timing for selecting a target object matches preset timing, or may be satisfied when the same target object is selected a certain number of times.

According to an exemplary embodiment, the information provision display 111 may be displayed as paper held by a bird which is a moving body, and this paper may also be moved in accordance with the moving body. Alternatively, the information provision display 111 may be a moving body other than a bird, such as a vehicle including an air plane, a creature such as a butterfly, or a fallen leaf, which may move in the virtual space. Alternatively, hints on the progress of the game may be written on these moving bodies, or these moving bodies may hold the information provision display 111. Alternatively, paper falling in the virtual space may be a moving body, and a hint may be displayed on that paper.

According to an exemplary embodiment, the information provision display 111 may not be displayed unless the elapsed time exceeds the certain time. Alternatively, the information provision display 111 may be displayed simply when the gaze position is moved to outside the gameable area.

According to an exemplary embodiment, the information provision display 111 may be displayed on condition that the gaze position of the player moves outside the gameable area before the player completes selecting a target object. Alternatively, the information provision display 111 may be displayed when the gaze position of the player, which is within the gameable area, is shifted to being outside a target object before the player completes selecting the target object.

According to an exemplary embodiment, the movement range of the head may be represented by three rotation directions. However, according to other exemplary embodiments, the movement range of the head may be represented by variables other than these mentioned above. For example, the movement range of the head may be represented as, for example, "90 degrees to the left and 90 degrees to the right" and "30 degrees to the top and 30 degrees to the bottom" with reference the position and direction of the head of the player facing horizontally.

According to an exemplary embodiment, when the movement range of the head of the player becomes shifted to outside the reference range in at least one rotation direction, it may be determined that the movement range of the head of the player is outside the reference range. Alternatively, it may be determined that the movement range of the head of the player is outside the reference range when the movement range of the head of the player becomes outside the reference range for all rotation directions.

According to an exemplary embodiment, the information providing condition may be that the movement range of the head of the player has become shifted to outside the reference movement range of the head for selecting a target object. According to another exemplary embodiment, the information providing condition may be that the movement of the head of the player corresponds to a particular predetermined movement. The term "movement of the head" in these information providing conditions may be replaced with the term "gaze position". That is, according to an exemplary embodiment, the information providing condition may be that the movement range of the gaze position of the player has become outside the reference movement range of the gaze position for selecting a target object. According to another exemplary embodiment, the information providing condition may be that the movement of the gaze position of the player corresponds to a particular predetermined movement.

According to an exemplary embodiment, a hint on the progress of the game may be displayed as information provision. However, according to other exemplary embodiments, other types of information may be provided. For example, information such as menu items, score, the character's status, the time left for continuing the game, the progression stage of the game, or the like may be provided.

According to an exemplary embodiment, the information providing condition may include multiple information providing conditions described above. For example, an information providing condition may be either of the following conditions: "when the time elapsed since the start of the game is at least some predetermined time value, the gaze position of the player is outside a gameable area set in the virtual space" and "a range including the head movement becomes outside the reference range before the player accomplishes the mission". Alternatively, the information providing condition may include the condition of "the head movement corresponds to the certain movement". Other combinations of information providing conditions may also be understood. Even in doing so, information can be provided while reducing the loss of a sense of immersion in the virtual space.

According to some exemplary embodiments, information may be provided by outputting the information provision display 111 to the display 14. Alternatively, information may be provided when the information providing condition is satisfied by outputting sound regarding the details of a hint or by outputting a warning sound.

According to an exemplary embodiment, the HMD controller 11 may calculate the position and direction of the head on the basis of a detection signal obtained by the sensor 12. According to another exemplary embodiment, the HMD 10 may additionally perform some of the functions of the game processing apparatus 20.

In some exemplary embodiments, the gaze position of the player may be calculated on the basis of the position and direction of the head of the player. In other exemplary embodiments, the line-of-sight direction may be calculated on the basis of the positions of the pupils, and the gaze position may be identified from the line-of-sight direction. Alternatively, the line-of-sight direction may be calculated on the basis of the position and direction of the nose or the position and direction of the mouth, for example, and the gaze position may be identified from the line-of-sight direction. The direction of the nose or mouth may be defined as a direction from the back of the head to the nose or mouth, for example.

In some exemplary embodiments, the virtual image display apparatus may be implemented as a game processing apparatus. In other exemplary embodiments, the virtual image display apparatus may be applied to virtual reality systems for other applications. For example, the virtual image display apparatus may be applied to various types of simulations for driving, job training, or the like, trainings in medical fields, monitoring products, and movie or music appreciation. Even when the virtual image display apparatus is applied to virtual reality systems for applications other than games, information can be provided while reducing the loss of the player's (user's) sense of immersion in the virtual space.

What is claimed is:

1. A computer program product embodied on a non-transitory computer-readable medium, comprising code executable by a virtual image display apparatus having at least a processor and a memory, the memory being configured to store an information providing condition of the virtual image display apparatus and being further configured to store to-be-provided information, to cause the virtual image display apparatus to carry out the following steps:

detecting, with a sensor operationally linked to the virtual image display apparatus, a movement of a body part of a player, the body part comprising at least one of a head of the player and an eye of the player, and the sensor being at least one of the set of: a gyro sensor configured to measure movement of the head of the player, an acceleration sensor configured to measure movement of the head of the player, a geomagnetic sensor configured to measure movement of the head of the player and a line-of-sight sensor configured to measure movement of the eye of the player; and determining, based on the movement of the body part of the player, a position and direction of the body part of a player;

displaying, on a display operationally linked to the virtual image display apparatus, in accordance with the position and direction of the body part of the player, an image of a virtual space including a first area and a second area; and with the virtual image display apparatus, providing, when the information providing condition is satisfied, the to-be-provided information to the player by displaying the to-be-provided information in the second area;

wherein the information providing condition is a condition of a gaze position moving to the second area from the first area, the gaze position being specified by at least one of the body part of the player being in a specified position or the direction of the body part of the player being at least a specified direction.

2. The computer program product of claim 1, wherein
the virtual space includes a target object selectable by a gaze of the player,
wherein an area including the target object is recorded in the memory,
wherein the information providing condition includes a condition wherein a gaze position of the player, the gaze position being identified from the position and the direction of the body part of the player, becomes directed outside the area, and
further comprising providing, with the virtual image display apparatus, the to-be-provided information to the player when the gaze position of the player becomes directed outside the area.

3. The computer program product of claim 1, wherein
the virtual space includes a target object selectable by a gaze of the player,
wherein the information providing condition includes a condition wherein a gaze position of the player, the gaze position being identified from the position and direction of the body part of the player, moves outside the target object before the player completes selecting the target object, and
further comprising providing, with the virtual image display apparatus, the to-be-provided information to the player when the gaze position of the player moves outside the target object before the player completes selecting the target object.

4. The computer program product of claim 1, wherein
the information providing condition comprises a reference range regarding movement of the body part of the player,
wherein the information providing condition includes a condition wherein the movement of the body part of the player has gone outside the reference range, and
further comprising providing, with the virtual image display apparatus, the to-be-provided information to the player when the movement of the body part of the player becomes outside the reference range.

5. The computer program product of claim 1, wherein
the memory comprises a recording of a predetermined movement of the body part of the player,
wherein the information providing condition includes a condition wherein movement of the body part of the player corresponds to the predetermined movement recorded in the memory, and
further comprising providing, with the virtual image display apparatus, the to-be-provided information to the player when the movement of the body part of the player corresponds to the predetermined movement recorded in the memory.

6. The computer program product of claim 1, further comprising displaying, with the virtual image display apparatus, the to-be-provided information on an object in the virtual space.

7. The computer program product of claim 1, further comprising displaying, with the virtual image display apparatus, the to-be-provided information in a direction in which a moving body is moving, wherein the moving body is an object in the virtual space which moves in the virtual space.

8. A virtual image display apparatus that is configured to display an image of virtual space on a display, the image of virtual space of the display being based on the output of a detector for identifying a position and direction of a body part of a player, the body part comprising at least one of a head of the player and an eye of the player, the detector being at least one of the set of: a gyro sensor configured to measure movement of the head of the player, an acceleration sensor configured to measure movement of the head of the player, a geomagnetic sensor configured to measure movement of the head of the player and a line-of-sight sensor configured to measure movement of the eye of the player, the detector configured to identify the position and direction of the body part of the player based on the movement of the body part of the player, the virtual image display apparatus comprising:
a memory, the memory comprising a recording of an information providing condition and to-be-provided information; and
a processor, the processor being configured to display the image of the virtual space on the display in accordance with the position and direction of the certain body part of the player, the virtual space including a first area and a second area;
the processor further being configured to output the to-be-provided information to the player when the information providing condition is satisfied by displaying the to-be-provided information in the second area;
wherein the information providing condition is a condition of a gaze position moving to the second area from the first area, the gaze position being specified by at least one of the body part of the player being in a specified position or the direction of the body part of the player being at least a specified direction.

9. A virtual image display method for displaying an image of virtual space on a display that displays an image by using a virtual image display apparatus, a detector for identifying a position and direction of a body part of a player, the body part comprising at least one of a head of the player and an eye of the player, the detector being at least one of the set of: a gyro sensor configured to measure movement of the head of the player, an acceleration sensor configured to measure movement of the head of the player, a geomagnetic sensor configured to measure movement of the head of the player and a line-of-sight sensor configured to measure movement of the eye of the player, the detector configured to identify the position and direction of the body part of the player based on the movement of the body part of the player, and the display, the virtual image display apparatus including a processor and a memory, the memory comprising a recording of an information providing condition and to-be-provided information, the method comprising:
with the processor, displaying the image of the virtual space on the display in accordance with the position and direction of the certain body part of the player, the virtual space including a first area and a second area; and
with the processor, providing, when the information providing condition is satisfied, the to-be-provided information to the player by displaying the to-be-provided information in the second area;
wherein the information providing condition is a condition of a gaze position moving to the second area from the first area, the gaze position being specified by at least one of the body part of the player being in a specified position or the direction of the body part of the player being at least a specified direction.

* * * * *